(12) United States Patent
Burago et al.

(10) Patent No.: US 7,576,749 B2
(45) Date of Patent: Aug. 18, 2009

(54) POSITIONING SCREEN ELEMENTS

(75) Inventors: Andrei Burago, Kirkland, WA (US);
Sergey Genkin, Kirkland, WA (US);
Victor E. Kozyrev, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 11/228,961

(22) Filed: Sep. 15, 2005

(65) Prior Publication Data

US 2007/0057965 A1 Mar. 15, 2007

(51) Int. Cl.
*G09G 5/00* (2006.01)
(52) U.S. Cl. .................................. 345/581; 345/619
(58) Field of Classification Search ................. 345/619, 345/581
See application file for complete search history.

(56) References Cited

U.S. PATENT DOCUMENTS

| | | | |
|---|---|---|---|
| 5,468,077 A | | 11/1995 | Motokado et al. |
| 5,489,920 A | * | 2/1996 | Kaasila ........................ 345/443 |
| 5,559,939 A | * | 9/1996 | Wada et al. ................... 715/267 |
| 5,940,084 A | * | 8/1999 | Motokado et al. ........... 345/468 |
| 5,946,001 A | * | 8/1999 | Isaka ........................... 345/470 |
| 5,987,481 A | * | 11/1999 | Michelman et al. ......... 715/219 |
| 6,549,660 B1 | * | 4/2003 | Lipson et al. ................ 382/224 |
| 6,934,910 B2 | * | 8/2005 | Lange ........................ 715/267 |
| 6,952,210 B1 | * | 10/2005 | Renner et al. ............... 345/471 |
| 7,242,404 B2 | * | 7/2007 | Burago et al. ............ 345/472.2 |
| 2003/0182013 A1 | * | 9/2003 | Moreas et al. .............. 700/145 |
| 2004/0119714 A1 | * | 6/2004 | Everett et al. ............... 345/471 |
| 2006/0256116 A1 | * | 11/2006 | Burago et al. ............... 345/467 |
| 2007/0176935 A1 | * | 8/2007 | Arnold et al. ............... 345/467 |

FOREIGN PATENT DOCUMENTS

| | | |
|---|---|---|
| JP | 06-149209 | 5/1994 |
| JP | 05-141660 | 6/2005 |

OTHER PUBLICATIONS

"Displaying mathematics in a web browser using MathML and SVG" by Russel Bruhn, Philip Burton, 2004, ACM.*
International Search Report for PCT/US2006/036253.
International Search Report for PCT/US2006/036253, Sep. 15, 2005.

* cited by examiner

*Primary Examiner*—Kee M Tung
*Assistant Examiner*—Javid A Amini
(74) *Attorney, Agent, or Firm*—Merchant & Gould P.C.

(57) ABSTRACT

An approach for positioning screen elements on a display screen is disclosed herein. The screen elements represent expressions in a formula and may include one or more glyphs. Optimal positions are determined for the screen elements based on analyzing positional characteristics associated with displaying the screen elements at the resolution supported by the display screen against positional characteristics based on an optimal resolution. This analysis indicates whether the degree of displacement between display of a screen element at the actual resolution and display of the screen element at the optimal resolution would exceed a predetermined threshold level. If not, the screen element is output for display on the display screen based on the positional characteristics associated with the display screen resolution. Otherwise, the positional characteristics based on the actual resolution are modified such that the degree of displacement conforms to the threshold level.

18 Claims, 8 Drawing Sheets

POSITIONING SCREEN ELEMENTS

BACKGROUND

Conventional "type and see" computer applications such as word processors, spreadsheet programs, text editors, email programs and the like typically output information for display on a monitor having a vastly lower resolution than that provided by any printer. With that said, printer resolution is commonly referred to as "high" resolution whereas monitor resolution is often coined "low" resolution. This low resolution is due the physical limitations on the number of pixels that may be provided on display screens of conventional monitors. While new technologies such as plasma-based monitors and liquid crystal displays utilize smaller pixels and, consequently, provide more pixels per inch than conventional monitors, these still emerging technologies are drastically more expensive than conventional monitors but still don't provide the high resolution available with even mid-grade laser printers.

Ideally, these emerging technologies will be operable to display information in substantially the same high resolution provided by printers such that superimposing printed information on a display screen would yield the same size and positioning of the presented information. While such an "optimal" resolution is currently not available, application developers strive to at least maintain the positioning of information consistent between display screens and printed documentation even if it results in diminishing legibility. To accomplish this, it is common practice to scale down printer positioning of information for display on a display screen. However, by such reduction, the displayed information appears to run together thereby hindering the reader's ability to distinguish between characters. This problem is further exuberated in the construction of formulas, which typically include elements in close relation to each other such as the case with exponential elements and fractions.

It is with respect to these and other considerations that the present invention has been made.

SUMMARY

The present invention is generally related to determining optimal positions for elements being displayed on a display screen given resolution constraints associated with the display screen. More particularly, the present invention involves positioning elements of a formula optimally on a display screen taking into account such resolution limitations. For example, the present invention is applicable to determine an optimal position for a screen element representing a superscript relative to a screen element representing a base character to form an exponential formula expression.

In response to receipt of instruction to display a screen element on a display screen, an embodiment of the present invention involves determining positioning characteristics for displaying the screen element on the display screen. The positioning characteristics represent a screen layout for the screen element at the actual resolution of the display screen. The determined positioning characteristics of the screen element at actual resolution (AR) are analyzed against positioning characteristics associated with an optimal resolution (OR) to determine whether the AR-based positioning characteristics should be modified prior to outputting the screen element for display to the screen.

In an embodiment, this evaluation involves determining a degree of displacement between the screen element if displayed on the display screen based on the AR-based positioning characteristics and the screen element if displayed on the display screen based on the OR-based positioning characteristics. If the determined degree of displacement exceeds a predetermined threshold value, then the AR-based positioning characteristics are modified such that the displacement would substantially equal the threshold value and the screen element is displayed on the display screen based on the modified positioning characteristics. Otherwise, the screen element is displayed on the display screen based on the original AR-based positioning characteristics.

In accordance with another embodiment, the present invention relates to method for positioning a first screen element relative to a second screen element on a display screen. In response to receiving a request to display the first screen element adjacent to the second screen element, this method involves determining a first set of positioning characteristics for displaying the first screen element relative to the second screen element based on an actual resolution of the display screen. If the first set of positioning characteristics indicates that the first screen element would be separated from the second screen element by at least a predetermined amount of empty space, then method includes displaying the first screen element on the display screen based on a vertical position determined from the first set of positioning characteristics and a horizontal position determined from a second set of positioning characteristics that are based on an optimal resolution.

The various embodiments of the present invention may be implemented as a computer process, a computing system or as an article of manufacture such as a computer program product or computer readable media. The computer program product may be a computer storage media readable by a computer system and encoding a computer program of instructions for executing a computer process.

These and various other features as well as advantages, which characterize the present invention, will be apparent from a reading of the following detailed description and a review of the associated drawings.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
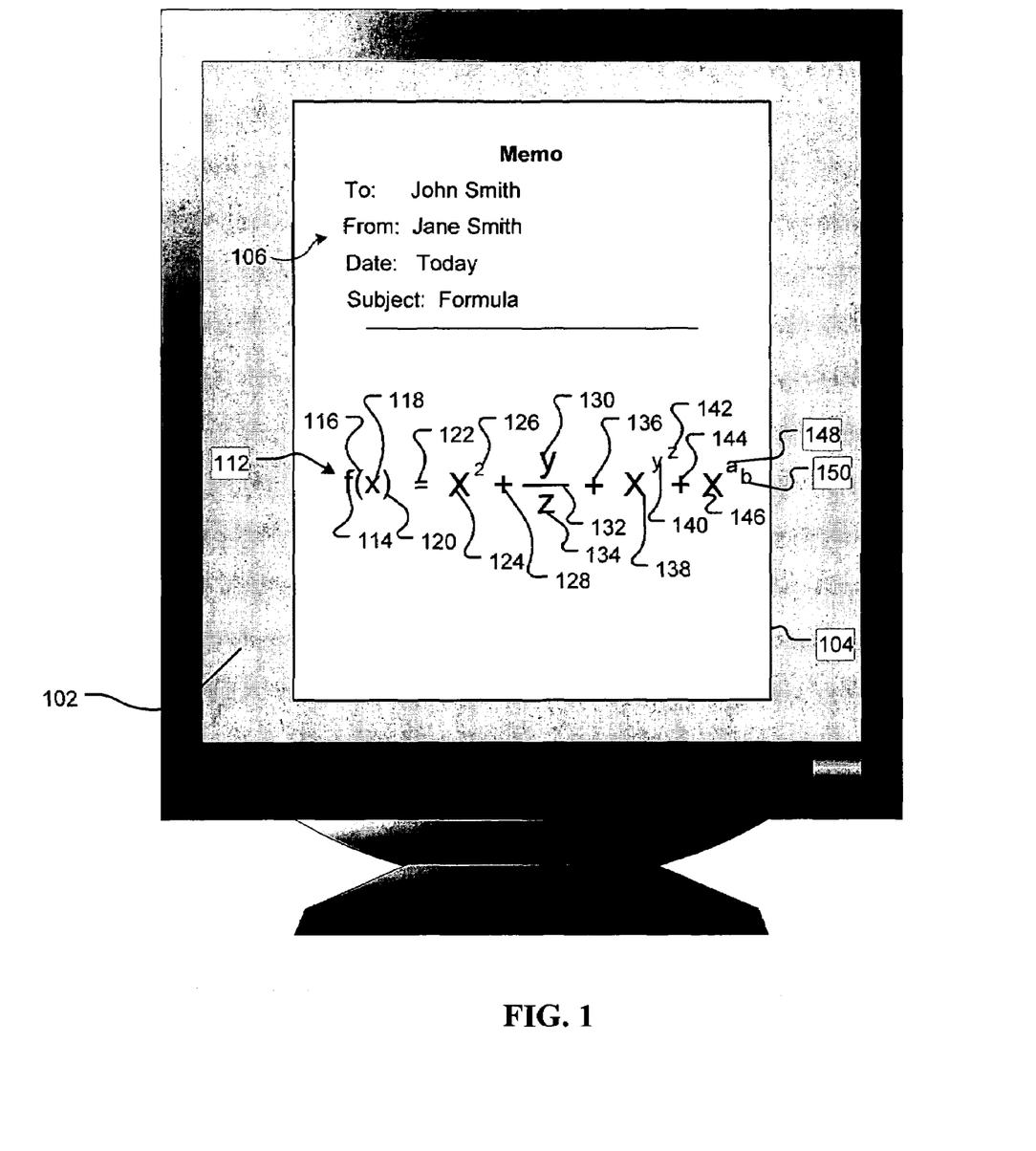
FIG. 1 illustrates display of screen elements positioned relative to one another in accordance with an embodiment of the present invention.

In general, the present invention relates to positioning screen elements relative to one another on a display screen. In accordance with an embodiment, the screen elements are one or more image representations ("glyphs") of characters and/or ligatures. In accordance with an exemplary embodiment, the present invention is described herein with reference to glyphs individually or collectively representing expressions or sub-expressions in a formula in a word processing document being displayed through a display screen. For example, FIG. 1 illustrates a formula 112 having glyphs 114-142 displayed as content in a word processing document 104 presented to users through a display screen 102. While some of these glyphs (e.g., 122) individually represent a single formula expression ("="), other glyphs (e.g., 124 and 126) collectively represent a single formula expression (e.g., "$X^2$") and yet other glyphs (e.g., 148 and 150) collectively represent a single sub-expression for complete formula expression (e.g., "$X^{a_b}$").

Figure 2:
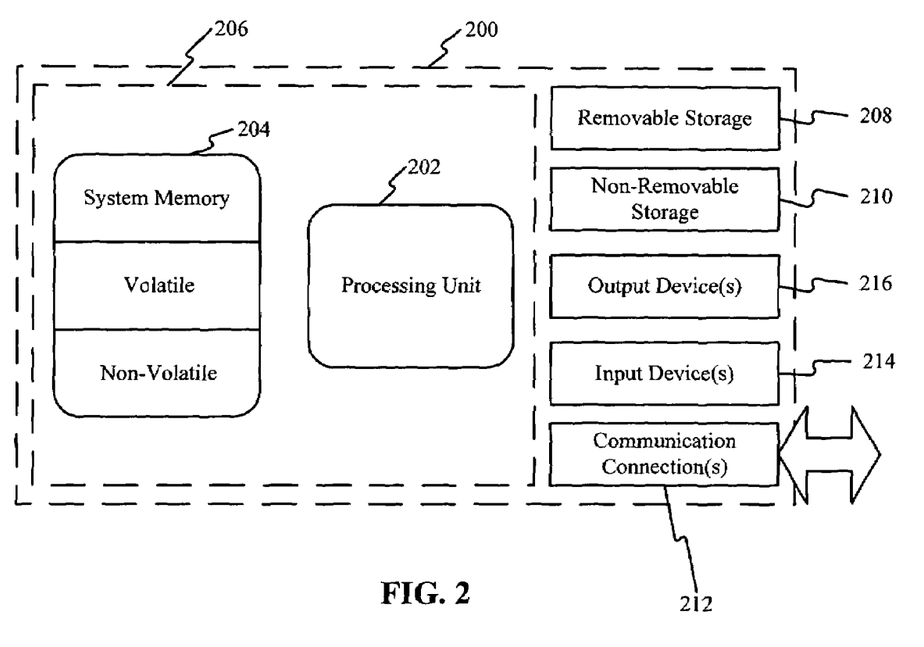
FIG. 2 shows an exemplary computer system upon which embodiments of the present invention may be implemented.

Embodiments of the present invention are illustrated herein with reference to positioning the glyphs 114-142 relative to one another to form the expressions and sub-expressions of the formula 112 in accordance with an exemplary embodiment of the present invention. FIG. 1 illustrates the formula 112 at a point in time after the glyphs 114-142 have already been positioned and, thus, the formula expressions and sub-expressions already formed. FIGS. 3-7, on the other hand, illustrate a process 300 for positioning the glyphs 114-142 to render this resultant formula 112 in accordance with an embodiment of the present invention. Prior to further describing the positioning process 300 with reference these figures, however, an exemplary computing environment (e.g., computing device 200) for practicing the process 300 is shown in FIG. 2 and described in the following paragraphs below.

In its most basic configuration, the computing device 200 includes at least one processing unit 202 and memory 204. Depending on the exact configuration and type of computing device 200, the memory 204 may be volatile (such as RAM), non-volatile (such as ROM, flash memory, etc.) or some combination of the two. The most basic configuration of the computing device 200 is illustrated in FIG. 2 by dashed line 206. Additionally, computing device 200 may also have additional features/functionality. For example, computing device 200 may also include additional storage (removable and/or non-removable) including, but not limited to, magnetic or optical disks or tape. Such additional storage is illustrated in FIG. 2 by removable storage 208 and non-removable storage 210.

Computer storage media, as used herein, includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

The computing device 200 may also contain communications connection(s) 212 for communicating with other devices. The communications connection(s) 212 is/are an example of communication media. By way of example, and not limitation, communication media includes wired media such as a wired network or direct-wired connection, and wireless media such as acoustic, RF, infrared, and other wireless media.

The computing device 200 may also have input device(s) 214 such as keyboard, mouse, pen, voice input device, touch input device, etc. Output device(s) 216 such as a display, speakers, printer, etc. may also be included. The devices may help form the user interface 104 discussed above. All these devices are well know in the art and need not be discussed at length here.

The computing device 200 typically includes at least some form of computer readable media. Computer readable media can be any available computer storage media that can be accessed by processing unit 202.

The computing device 200 may operate in a networked environment using logical connections to one or more remote computers (not shown). The remote computer may be a personal computer, a server computer system, a router, a network PC, a peer device or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computing device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application program may reside on memory device connected to the remote computer system. It will be appreciated that the network connections explained are exemplary and other means of establishing a communications link between the computers may be used.

With the computing environment of FIG. 2 in mind, logical operations of the various exemplary embodiments described below in connection with the positioning process 300 may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Figure 3:
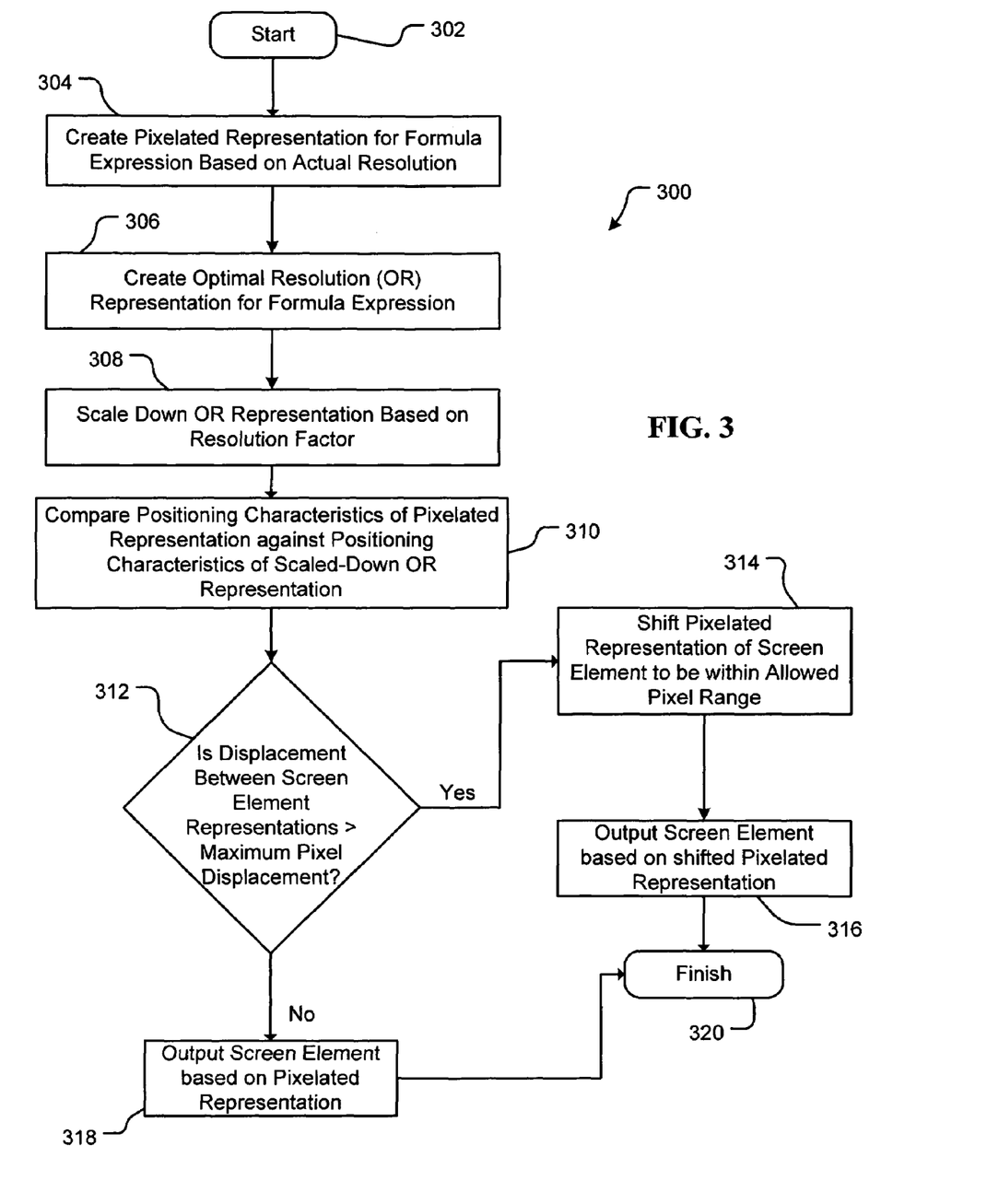
FIG. 3 is a flow diagram illustrating operational characteristics of a process for positioning a screen element shown in FIG. 1 relative to another screen element in accordance with an embodiment of the present invention.

Referring now to FIG. 3, the positioning process 300 embodies operational characteristics practiced by an application program implemented on the computing device 200. Exemplary application programs include, but certainly are not limited to, word processing applications, spreadsheet applications, presentation applications, application development applications, text editor applications, electronic mail applications and web browsers. With that said, the positioning process 300 is operable to position any type of screen element relative to one another on a display screen (e.g., 102).

In accordance with an exemplary embodiment, the positioning process 300 illustrates construction of the formula 112 of FIG. 1 by positioning glyphs (e.g., 114-142) relative to one another to form and arrange the expressions and sub-expressions of the formula 112. For illustrative purposes, the positioning process 300 is described with reference to a point in time during the construction of the formula 112 when a screen element (i.e., superscript glyph 126 ("$^2$")) is being positioned relative to another screen element (i.e., base glyph 124 ("X")) to render the exponential formula expression "$X^2$" on the display screen 102. As such, to illustrate performance of the positioning process 300, reference to the term "screen element" in the text of the FIG. 3 refers to the superscript glyph 126 ("$^2$") while reference to term "expression" in the text of this figure refers to the complete expression "$X^2$." Even further, FIGS. 4-6 sequentially depict a conceptual illustration of performance of the positioning process 300 in relation to this exemplary illustration and are thus described in connection therewith.

While only a single iteration of the positioning process 300 is described below, this process 300 is repetitively practiced to accomplish display of the entire formula 112. The positioning process 300 therefore involves a flow of operations (i.e., an "operation flow") that are invoked either concurrently (e.g., concurrent process threading) or sequentially to position the various glyphs 114-142 to form expressions and sub-expressions for the formula 112. For example, FIG. 8, described in more detail below, illustrates the recursive nature of the positioning process 300 in connection with positioning glyphs 140 and 142 relative to glyph 138 and glyphs 148 and 150 relative to glyph 146 to form nested exponential expressions in accordance with an exemplary embodiment of the present invention.

The operation flow of the positioning process 300 begins with a start operation 302 and concludes with a terminate operation 320. The start operation 302 is initiated in response to receipt of an instruction to display a formula expression. As such, with respect to the exemplary illustration provided herein, such an instruction involves a request to position the superscript glyph 126 adjacent to the base glyph 124 to form the exponential expression "$X^2$." From the start operation 302, the operation flow passes to a first create operation 304.

The first create operation 304 determines the actual resolution for the display screen 102 and then creates a pixilated representation of the exponential expression "$X^2$" at the determined actual resolution. The display screen 102 is operable to display glyphs at various resolutions and, as such, the actual resolution may vary depending on times at which the positioning process 300 is implemented. With that said, an embodiment of the present invention involves determining the current actual resolution based on evaluating current display settings.

Figure 4:
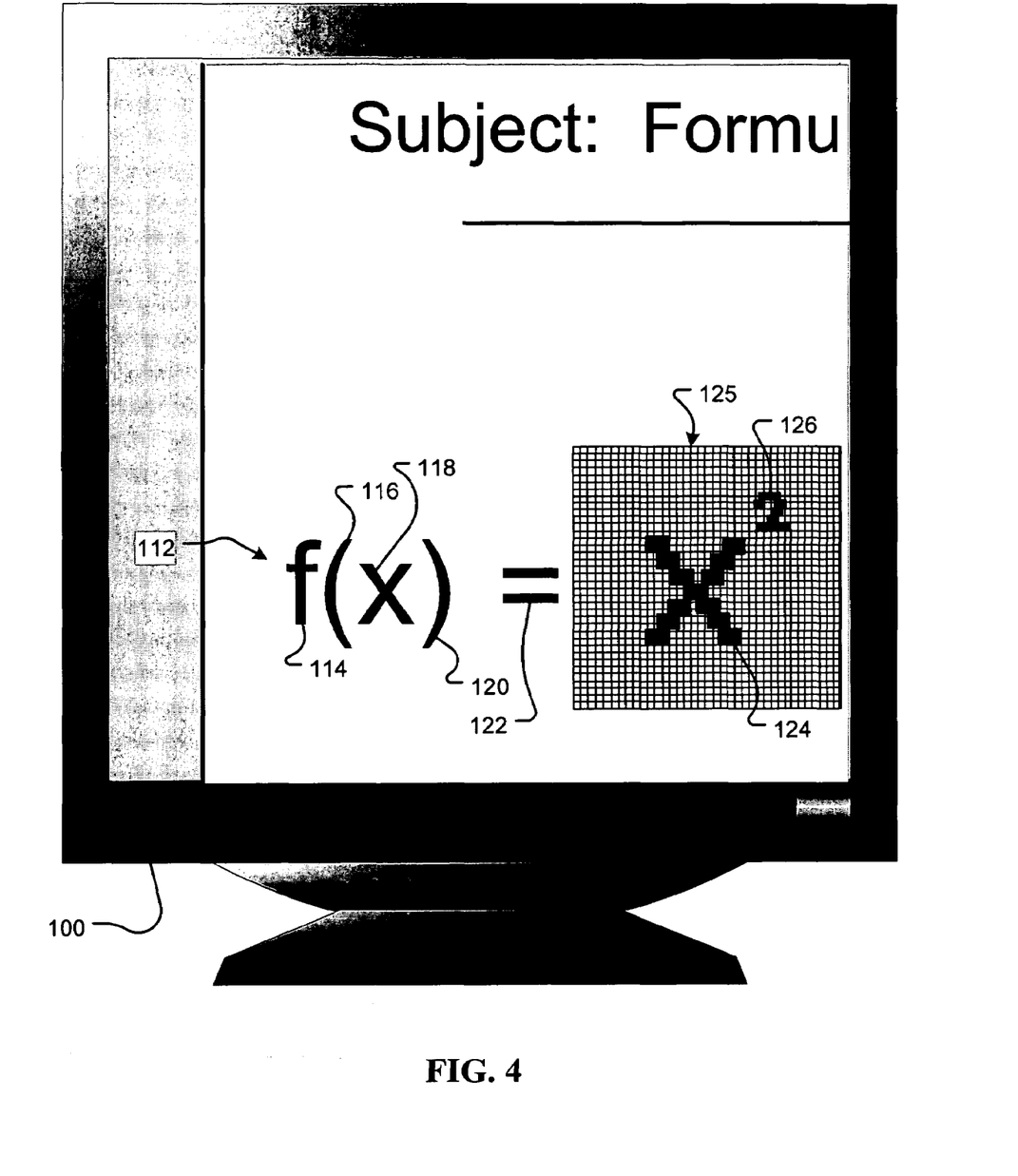
FIG. 4 illustrates a virtual representation of a screen layout for a screen element if displayed on a display screen at an actual resolution for the screen.

The pixilated representation is a virtual, in-memory representation of the superscript glyph 126 as would be displayed adjacent the base glyph 124 at the actual resolution. With that said, though, this representation is embodied in a data structure maintained internal to the application program for use in administering the positioning process 300 and is not displayed as output to the display screen 102 at least at this point in time. The data structure includes data identifying positioning characteristics (i.e., screen layout) for the superscript glyph 126 and the base glyph 124 at the actual resolution and, more particularly, which pixels on the display screen 102 are to be colored to provide an image of the exponential formula expression "$X^2$." To illustrate, FIG. 4 illustrates the superscript glyph 126 as it would be displayed on the display screen 102 adjacent the base glyph 124 based on the pixilated representation 125 created by the first create operation 304. From the first create operation 304, the operation flow passes to a second create operation 306.

The second create operation 306 determines an optimal resolution and then creates a representation of the exponential formula expression "$X^2$" at the determined optimal resolution. The optimal resolution representation is a virtual, in-memory representation of the superscript glyph 126 as would be displayed adjacent the base glyph 124 if the display screen 102 displayed glyphs at the optimal resolution. As such, this representation is embodied in a data structure maintained internal to the application program for use in administering the positioning process 300 and is not displayed as output to the display screen 102. The data structure includes coordinates that define hypothetical positioning characteristics (i.e., hypothetical screen layout) for the superscript glyph 126 and base glyph 124 at the optimal resolution.

In an embodiment, the optimal resolution is defined by the developer of the application program administering the positioning process 300. In accordance with another embodiment, the optimal resolution may be defined based on the resolution associated with a printer attached to the computing device 200. After the optimal resolution is determined and the associated representation of the exponential formula expression "$X^2$" has been created, the operation flow passes from the second create operation 306 to a scale operation 308.

The scale operation 308 scales down the optimal resolution representation to conform to resolution constraints associated with the display screen 102. To accomplish this, the scale operation 308 applies a resolution factor to the positioning characteristics (i.e., coordinates) defining the hypothetical screen layout of the superscript glyph 126 and the base glyph 124 at optimal resolution. In accordance with an embodiment, the resolution factor is based on a ratio of the defined optimal resolution to the actual resolution of the display screen 102. Alternatively, the resolution factor may be defined by other mathematical considerations that relate the optimal resolution to the actual resolution.

Figure 5:
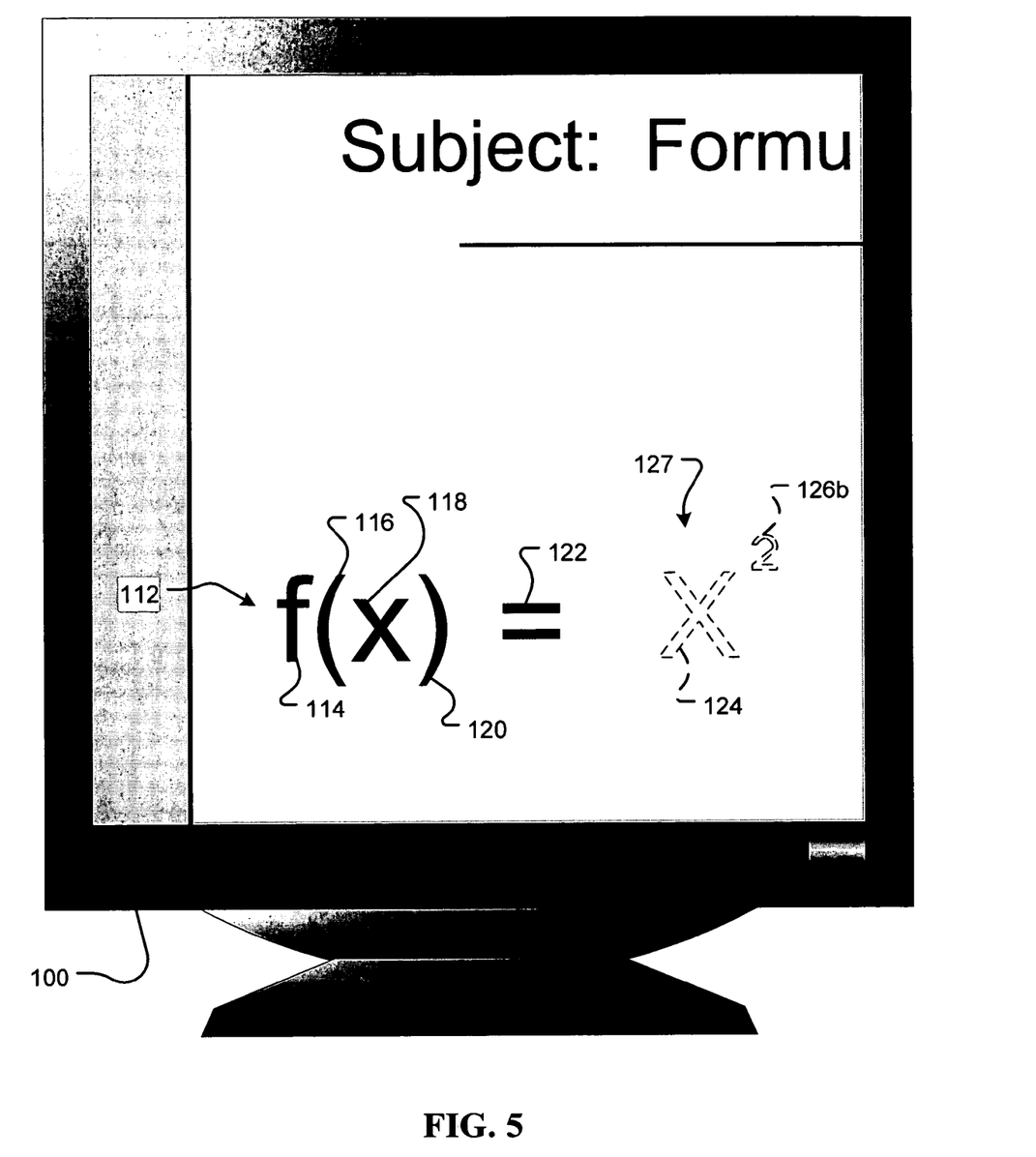
FIG. 5 illustrates a virtual representation of a screen layout for the screen element of FIG. 4 if displayed on the display screen based on an optimal resolution.

Once defined, the resolution factor is applied to the optimal resolution coordinates thereby rendering a scaled, or "rounded," down set of coordinates that represent a scaled-down optimal resolution representation of the superscript glyph 126 and the base glyph 124. Like the optimal resolution representation, the scaled-down optimal representation is embodied in a data structure maintained internal to the application program for use in administering the positioning process 300 and is not displayed as output to the display screen 102. FIG. 5 illustrates the superscript glyph 126 as it would be displayed on the display screen 102 adjacent the base glyph 124 based on the scaled-down optimal resolution representation 127. From the scale operation 308, the operation flow passes to a compare operation 310.

Figure 6:
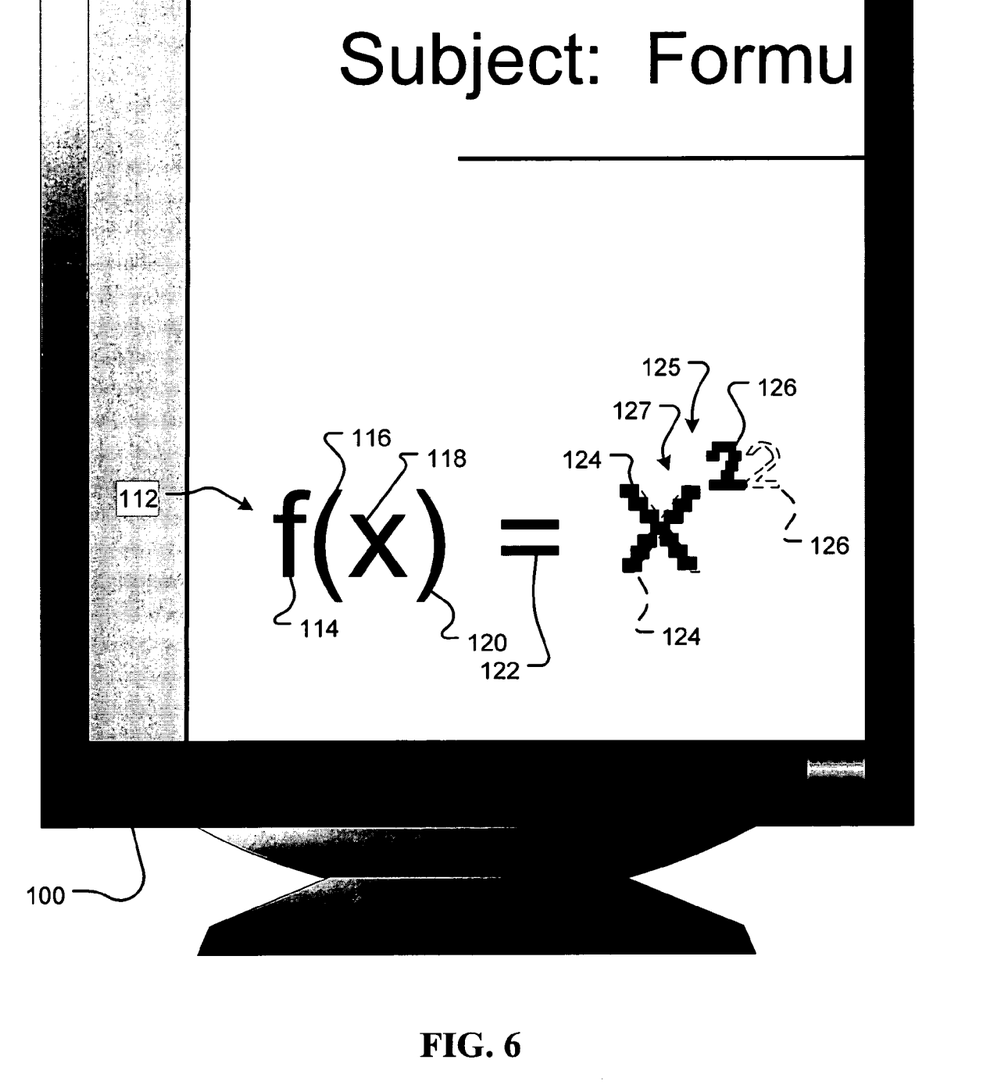
FIG. 6 illustrates comparison of the virtual representation shown in FIG. 4 with the virtual representation shown in FIG. 5.

The compare operation 310 analyzes the screen layouts specified by the pixilated representation 125 and the scaled-down optimal resolution representation 127 to determine the degree of displacement of the superscript representation 126 between these representations (125, 127) if displayed on the display screen 102. As noted above, the screen layouts specified by both representations are embodied in data structures maintained internal to the application program administering the positioning process 300. The compare operation 310 therefore renders analysis between the two representations by comparing the positioning of the two screen layouts relative to one another. In an embodiment, the compare operation 310 involves selecting common points (e.g., bottom-left corner) of the superscript glyph 126 on both screen layouts and measuring the number of pixels that would exist between the common points. In this embodiment, the compare operation 310 involves an analysis that can be logically represented by displaying both the pixilated representation 125 and the scaled-down optimal resolution representation 127 together on the display screen 102 and determining displacement of the superscript glyph 126 therebetween, as shown in FIG. 6.

After the compare operation 310 has determined the degree of displacement (in number of pixels) between the superscript glyph 126 on the pixilated representation 125 and the superscript glyph 126 on the scaled-down optimal resolution representation 127, the operation flow passes to a query operation 312. The query operation 312 determines whether the degree of displacement determined by the compare operation 310 exceeds a maximum pixel displacement value defined for optimal positioning. The maximum pixel displacement value represents a maximum number of pixels that may exist between the actual resolution representation of an evaluated glyph on the display screen 102 and the scaled-down optimal resolution representation of that glyph on the display screen 102. The maximum pixel displacement value, which may vary between different fonts, may be defined by either the developer of the application program or a user of the application program (e.g., by customizing display properties through an "options" dialog or the like).

If the degree of displacement exceeds the maximum pixel displacement, the query operation 312 passes the operation flow to a shift operation 314. The shift operation 314 shifts the superscript glyph 126 on the pixilated representation 125 toward the superscript glyph 126 on the scaled-down optimal resolution representation 127 such that the degree of displacement therebetween is equal to the maximum pixel displacement value and, therefore, within an "allowed" pixel range. As such, the data identifying a screen layout for the superscript glyph 126 at the actual resolution is modified based on the shift in the pixilated representation 125. From the shift operation 314, the operation flow passes to a first output operation 316.

The first output operation 316 specifies the appropriate pixels for coloring to display the superscript glyph 126 on the display screen 102 based on the shifted screen layout now specified for the pixilated representation 125. The first output operation 316 therefore results in the superscript glyph 126 being output to the display screen 102 for display to the user, as illustrated in FIG. 1. From the first output operation 316, the operation flow concludes at the terminate operation 320.

Referring back to the query operation 312, if the degree of displacement determined by the compare operation 310 does not exceed the maximum pixel displacement value defined for optimal positioning, the pixilated representation 125 is considered in the "allowed" pixel range relative to the scaled-down optimal resolution representation 127. Consequently, the operation flow passes to a second output operation 318.

The second output operation 318 specifies the appropriate pixels for coloring to display the superscript glyph 126 on the display screen 102 based on the screen layout specified for the pixilated representation 125. Thus, like the first output operation 316, the second output operation 318 results in the superscript glyph 126 being output to the display screen 102 for display to the user, as illustrated in FIG. 1.

Figure 7:
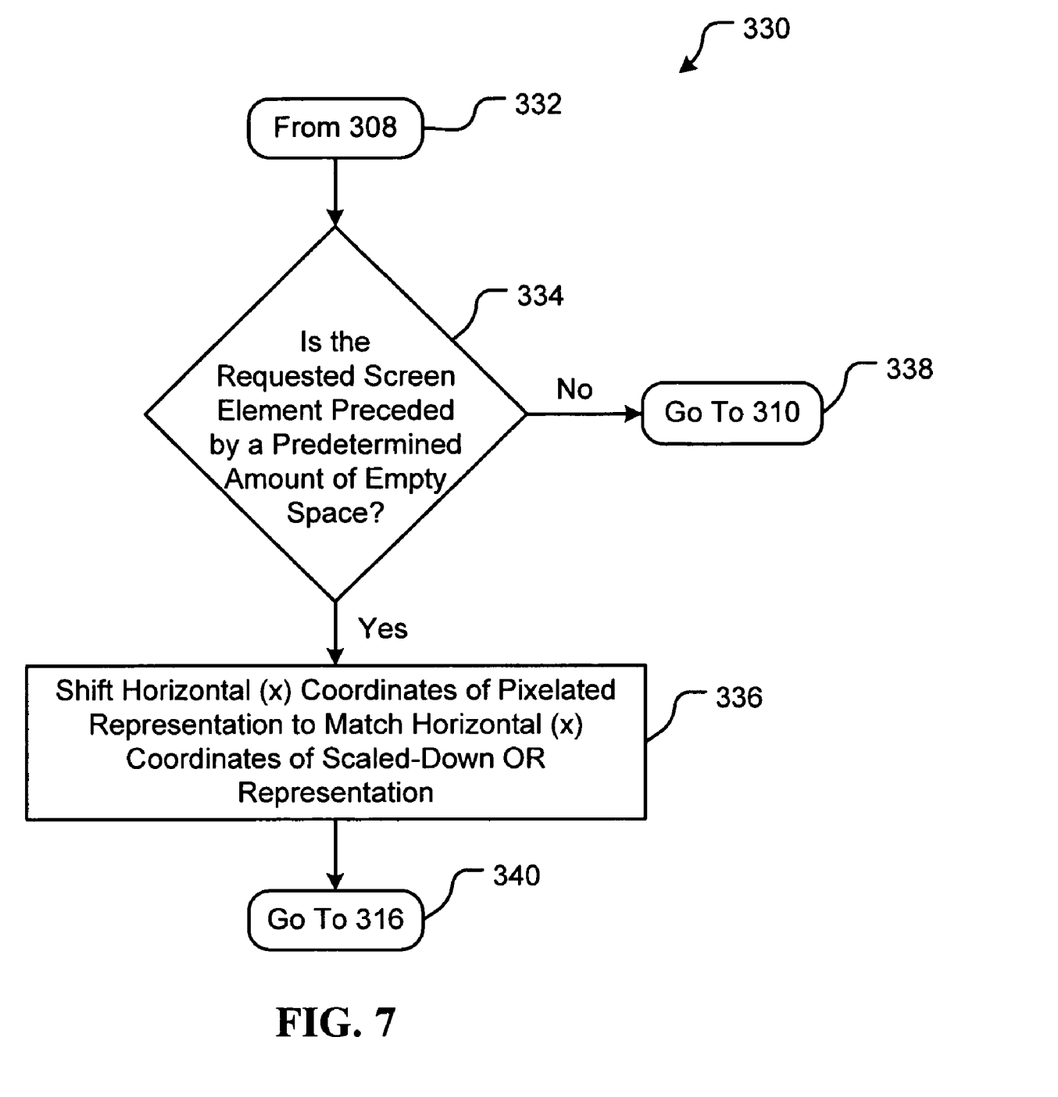
FIG. 7 is a flow diagram illustrating additional operational characteristics for use with the positioning process of FIG. 3 in accordance with an embodiment of the present invention.

Turning now to FIG. 7, an operation flow 330 for use with the positioning process 300 of FIG. 3 is shown in accordance with an embodiment of the present invention. In this embodiment, the positioning process 300 includes a query operation 334 that is invoked upon completion of the scale operation 308. The query operation 334 determines whether the glyph that is requested to be displayed is preceded by at least a predetermined amount of empty space (i.e., "white space"). In an embodiment, such a predetermined amount of empty space is determined by the developer of the application program. For example, the predetermined amount of empty space may be defined to be the amount of white space conventionally known to be associated with an operator. Exemplary operators include the equals sign, the plus sign and the minus sign. With that said, glyphs representing operators typically include sufficient white space for positioning any glyphs therearound and, thus, obviate the need for the determining whether the position of these operator-based glyphs or any glyphs following these operator-based glyphs should be shifted. In fact, with respect to fractional formula expressions having sub-expressions such as, for example, a+b/x+y, this abundance of white space typically results in the operators (e.g., +) in the sub-expressions aligning in a vertical orientation such that one operator is situated substantially above the other.

If the query operation 334 determines that the glyph that is requested to be displayed is preceded by the predetermined amount of empty space, then the operation flow of the positioning process 300 is passed directly to a partial shift operation 336. The partial shift operation 336 determines a position for the glyph based in part on the pixilated representation and in part on the scaled-down optimal resolution representation. For example, in an embodiment, the partial shift operation 336 shifts the horizontal positioning of the glyph specified by the pixilated representation to match the horizontal positioning of the glyph specified by the scaled-down optimal resolution representation while maintaining the vertical positioning of the glyph specified by the pixilated representation. The x-coordinates for use in displaying the requested glyph are therefore determined based on the scaled-down optimal resolution representation while the y-coordinates are determined based on the pixilated representation. The operation flow then passes from the partial shift operation 336 to the first output operation 316 via a first transfer operation 336.

If, however, the query operation 334 determines that the glyph that is requested to be displayed is not preceded by the predetermined amount of empty space, the operation flow of the positioning process 300 is passed to the compare operation 310 by a second transfer operation 338 thereby continuing the positioning process 300 as described above.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention.

For example, while exemplary screen elements are described herein as glyphs that represent characters and ligatures embodying formula expressions, it should be appreciated that the present invention is applicable to position any type of screen element. Moreover, embodiments of the present invention are described herein with reference to the positioning of these exemplary screen elements in a word processing document. However, the present invention is equally applicable to other types of electronic documents and, for that matter, any electronic document operable to provide a medium for displaying screen elements.

Furthermore, the computing device 200 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Figure 8:
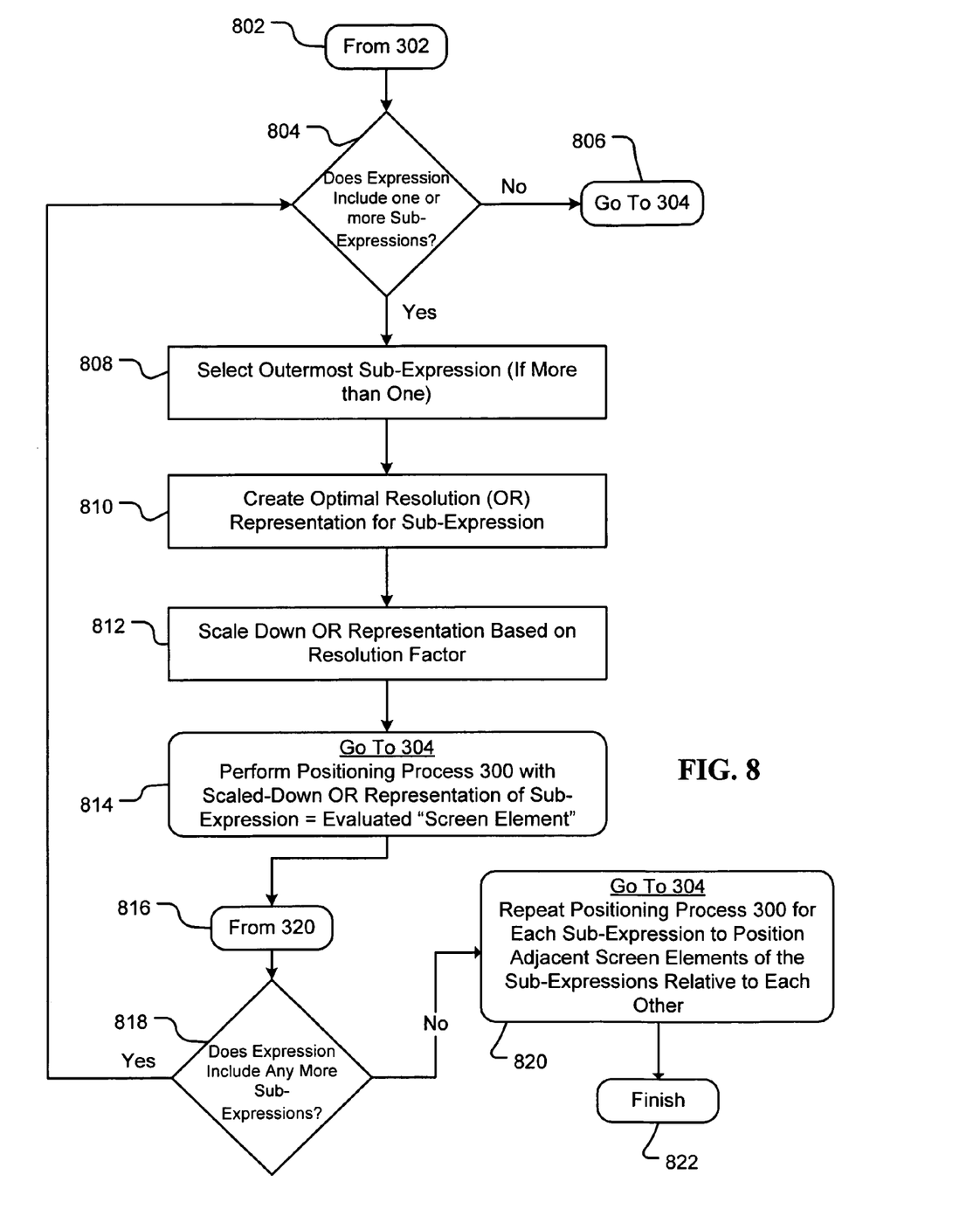
FIG. 8 is a flow diagram illustrating additional operational characteristics for use with the positioning process of FIG. 3 in accordance with an embodiment of the present invention.

In addition, while described in connection with positioning a screen element formed of a single glyph (i.e., superscript glyph 126 "$^2$") relative to another screen element also formed of a single glyph (base glyph 124 "X"), the positioning process 300 is also applicable to position a screen element formed of multiple glyphs relative to another screen element formed of one or more glyphs. For example, the positioning process is applicable to position glyphs (e.g., 130, 132 and 134) of a fractional expression relative to one another as well as nested superscript glyphs (e.g., 140, 142, 148 and 150) relative to base glyphs (e.g., 138 and 146). With regard to the latter, embodiments of the present invention involve the positioning of screen elements that constitute sub-expressions of an expression. To accomplish this, the positioning process 300 is administered in conjunction with an additional set of operations that define a recursive procedure for practicing the process 300, as shown in an exemplary manner in FIG. 8. Specifically, FIG. 8 illustrates a process 800 for recursively positioning screen elements, to define expressions having sub-expressions such as, for example, nested exponents (140/142 and 148/150).

The recursive positioning process 800 is performed using an operation flow that begins with a first transfer operation 802 and that concludes with a terminate operation 822. The first transfer operation 802 is initiated in response to initiation of the start operation 302 and serves to transfer the operation flow of the positioning process 300 from the start operation 302 to a first query operation 804 prior to invoking the first create operation 304. As such, the start operation 802 is triggered to initiate the recursive positioning process 800 in response to receipt of an instruction to display a formula expression, as described above with reference to the start operation 302. The first query operation 804 then determines whether the requested formula expression includes any sub-expressions. If so, the first query operation 804 passes the operation flow to a select operation 808. Otherwise, the first query operation 804 passes the operation flow to a second transfer operation 806 and the positioning process is resumed at the first create operation 304 as described above.

Illustrating the first query operation 804 relative to the exemplary formula 112, the formula expression "X$^2$", formed using the superscript glyph 126 and the base glyph 124 does not include any sub-expressions and, thus, this operation 804 would pass the operation flow to the second transfer operation 806 in this circumstance. However, the formula expression "X$^{a_b}$" formed using glyphs 146, 148 and 150 includes one sub-expression (i.e., "$^{a_b}$") and, therefore, the first query operation 804 would pass the operation flow to the select operation 808 in this circumstance. Therefore, to illustrate the recursive positioning process 800, this latter formula expression, i.e., "X$^{a_b}$," is illustrated herein.

The select operation 808 selects the glyphs embodying the outermost sub-expression in relation to the base screen element of the expression for initial evaluation by the recursive positioning process 800. With respect to both subscript and superscript sub-expressions, the outermost sub-expression refers to sub-expression furthest to the right, i.e., the "rightmost" sub-expression in the expression. With respect to the present illustration, the formula expression "X$^{a_b}$" only has one sub-expression, i.e., "$a_b$," and therefore, this sub-expression embodies the outermost sub-expression that will be applied to the recursive positioning process 800. The select operation 810 therefore selects glyphs 148 and 150 as the screen elements for initial evaluation by the recursive positioning process 800. After such selection, the operation flow of the recursive positioning process 800 passes to a first create operation 810.

The first create operation 810 determines an optimal resolution and then creates a representation of the selected sub-expression "$a_b$" at the determined optimal resolution. The optimal resolution representation is a virtual, in-memory representation of the glyph 150 ("b") as it would be displayed adjacent the glyph 148 ("a") if the display screen 102 displayed glyphs at the optimal resolution. This representation is embodied in a data structure maintained internal to the application program for use in administering the recursive positioning process 800 and is not displayed as output to the display screen 102. The data structure includes coordinates that define hypothetical positioning characteristics (i.e., hypothetical screen layout) for the glyph 150 ("b") relative to the glyph 148 ("a") at the optimal resolution. After the optimal resolution is determined and the associated representation of the selected sub-expression "$a_b$" has been created, the operation flow passes from the first create operation 810 to a scale operation 812.

The scale operation 308 scales down the optimal resolution representation to conform to resolution constraints associated with the display screen 102. To accomplish this, the scale operation 812 applies a resolution factor to the positioning characteristics (i.e., coordinates) defining the hypothetical screen layout of the glyph 150 ("b") relative to the glyph 148 ("a") at optimal resolution. The optimal resolution coordinates thereby rendering a scaled, or "rounded," down set of coordinates that represent a scaled-down optimal resolution representation of the sub-expression "$a_b$." Like the optimal resolution representation, the scaled-down optimal representation is embodied in a data structure maintained internal to the application program for use in administering the recursive positioning process 800 and is not displayed as output to the display screen 102. From the scale operation 812, the operation flow passes to a third transfer operation 814.

The third transfer operation 814 transfers the operation flow of the recursive positioning process 800 back to the positioning process 300. In addition, the third transfer operation 814 specifies the scaled-down optimal representation of the sub-expression "$a_b$" to be the "screen element" positioned relative to the screen element to which the sub-expression is adjacent, which, in the present illustration is the base glyph 146 ("X") of the formula expression "X$^{a_b}$." The positioning process 300 is then administered as described above such that the sub-expression "$a_b$" is optimally positioned relative to the base glyph 146 ("X"). At the completion of the positioning process 300, the operation flow passes from the terminate operation 320 and is passed back to the recursive positioning process 800 via a fourth transfer operation 816 for further evaluation. The fourth transfer operation 816 accepts the operation flow of the positioning process 300 and resumes the operation flow of the recursive positioning process 800 at a fifth transfer operation 820.

The fifth transfer operation 820 re-initiates the positioning process 300 for each of the sub-expressions iterated through the recursive positioning process 800 such that each of the glyphs contained therein are optimally positioned relative to one another. For example, with respect to the present illustration, the glyph 150 ("b") is optimally positioned adjacent the glyph 148 ("a") using the positioning process 300. In this regard, the order through which glyphs in the formula expression are evaluated is reversed relative to initial iterations of the recursive positioning process 800. After each of the sub-expressions have been applied to the positioning process 300, the operation flow of the recursive positioning process 800 concludes at the terminate operation 822.

What is claimed is:

1. A computer storage medium comprising computer-executable instructions that, when executed by one or more processors, cause the one or more processors to:

receive a request to display a screen element on a display screen;

in response to receiving the request, determine a first set of positioning characteristics that indicates pixels that provide a first pixilated representation of the screen element at a first resolution;

determine a second set of positioning characteristics that indicates pixels that provide a second pixilated representation of the screen element at the first resolution at least in part by scaling a third pixilated representation of the screen element at a second resolution to conform to the first resolution, wherein the second resolution is different than the first resolution;

analyze the first set of positioning characteristics against the second set of positioning characteristics to determine a degree of displacement, wherein the degree of displacement represents an approximate number of pixels that would exist between a first point and a second point, wherein the first point is a point on the display screen that would be at a given point within the screen element when the screen element is displayed on the display screen based on the first set of positioning characteristics, and wherein the second point is a point on the display screen that would be at the given point within the screen element when the screen element is displayed on the display screen based on the second set of positioning characteristics;

determine whether the degree of displacement exceeds a predetermined threshold value that represents a number of pixels; and automatically modify the first set of positioning characteristics when it is determined that the degree of displacement exceeds the predetermined threshold value.

2. A computer storage medium as defined in claim 1,
wherein the instructions, when executed by the one or more processors, cause the one or more processors to display the screen element on the display screen based on the first set of positioning characteristics if the degree of displacement does not exceed the predetermined threshold value, and wherein the instructions, when executed by the one or more processors, cause the one or more processors to display the screen element after the instructions cause the one or more processors to analyze the first set of positioning characteristics against the second set of positioning characteristics.

3. A computer storage medium as defined in claim 2,
wherein the instructions, when executed by the one or more processors, cause the one or more processors to display the screen element on the display screen based on the modified first set of positioning characteristics if the degree of displacement exceeds the predetermined threshold value, and wherein the instructions, when executed by the one or more processors, cause the one or more processors to display the screen element after the instructions cause the one or more processors to modify the first set of positioning characteristics.

4. A computer storage medium as defined in claim 1, wherein the first resolution is the actual resolution of the display screen and the second resolution is associated with an optimal resolution.

5. A computer storage medium as defined in claim 4, wherein the instructions, when executed by the one or more processors, cause the one or more processors to determine the second set of positioning characteristics at least in part by causing the one or more processors to:

determine a ratio of the actual resolution to the optimal resolution; and determine the second set of positioning characteristics by applying the ratio to a third set of positioning characteristics that indicate pixels that provide the third pixilated representation of the screen element.

6. A computer storage medium as defined in claim 1,
wherein the instructions, when executed by the one or more processors, cause the one or more processors to modify the first set of positioning characteristics such that the number of pixels represented by the degree of displacement equals the number of pixels represented by the predetermined threshold value.

7. A computer storage medium as defined in claim 1, wherein the screen element represents a formula expression.

8. A computer storage medium comprising computer-executable instructions that, when executed by one or more processors, cause the one or more processors to:

receive a request to display a first screen element adjacent to a second screen element;

in response to receiving the request, determine a first set of positioning characteristics that indicates locations of pixels that provide a first pixilated representation of the first screen element at an actual resolution of a display screen relative to the second screen element;

determine whether the first set of positioning characteristics indicates that the first screen element would be separated from the second screen element by at least a predetermined amount of empty space; and if the first set of positioning characteristics indicates that the first screen element would be separated from the second screen element by at least the predetermined amount of empty space, the instructions cause the one or more processors to:

determine a second set of positioning characteristics that indicate locations of pixels that provide a second pixilated representation of the first screen element relative to the second screen element at least in part by scaling a third pixilated representation of the first screen element at an optimal resolution to conform to the actual resolution of the display screen; and display the first screen element on the display screen based on a vertical position determined from the first set of positioning characteristics and a horizontal position determined from the second set of positioning characteristics.

9. A computer storage medium as defined in claim 8, wherein if the first set of positioning characteristics indicates that the first screen element would not be separated from the second screen element by at least the predetermined amount of empty space, the instructions, when executed by the one or more processors, cause the one or more processors to evaluate the first set of positioning characteristics against the second set of positioning characteristics to determine whether the first set of positioning characteristics should be modified.

10. A computer storage medium as defined in claim 9, wherein the instructions, when executed by the one or more processors, cause the one or more processors to evaluate the first set of positioning characteristics against the second set of positioning characteristics at least in part by causing the one or more processors to:
   analyze the first set of positioning characteristics against the second set of positioning characteristics to determine a degree of displacement, wherein the degree of displacement represents an approximate number of pixels that would exist between a first point and a second point, wherein the first point is a point on the display screen that would be at a given point within the screen element when the screen element is displayed on the display screen based on the first set of positioning characteristics, and wherein the second point is a point on the display screen that would be at the given point within the screen element when the screen element is displayed on the display screen based on the second set of positioning characteristics;
   determine whether the degree of displacement exceeds a predetermined threshold value that represents a number of pixels; and
   modify the first set of positioning characteristics when it is determined that the degree of displacement exceeds the predetermined threshold value.

11. A computer storage medium as defined in claim 10, wherein the instructions, when executed by the one or more processors, further cause the one or more processors to display the first screen element on the display screen based on the first set of positioning characteristics when it is determined that the degree of displacement does not exceed the predetermined threshold value.

12. A computer storage medium as defined in claim 11, wherein the instructions, when executed by the one or more processors, further cause the one or more processors to display the first screen element on the display screen based on the modified first set of positioning characteristics when it is determined that the degree of displacement exceeds the predetermined threshold value.

13. A computer storage medium as defined in claim 10, wherein the instructions, when executed by the one or more processors, cause the one or more processors to determine the second set of positioning characteristics at least in part by causing the one or more processors to:
   determine a ratio of the actual resolution to the optimal resolution; and
   determine the second set of positioning characteristics by applying the ratio to a third set of positioning characteristics that indicate pixels that provide the third pixilated representation of the first screen element.

14. A computer storage medium as defined in claim 10, wherein the instructions, when executed by the one or more processors, cause the one or more processors to modify the first set of positioning characteristics at least in part by causing the one or more processors to modify the first set of positioning characteristics such that the number of pixels represented by the degree of displacement equals the number of pixels represented by the predetermined threshold value.

15. A computer storage medium comprising computer-executable instructions that, when executed by one or more processors, cause the one or more processors to:
   determine a first set of positioning characteristics that indicate locations of pixels that provide a first pixilated representation of the first screen element relative to a location of the second screen element, wherein the first pixilated representation is at a first resolution;
   determine a second set of positioning characteristics that indicate locations of pixels that provide a second pixilated representation of the first screen element relative to a location of the second screen element at least in part by scaling a third pixilated representation of the first screen element at a second resolution to conform to the first resolution, wherein the second resolution is different than the first resolution;
   analyze the first set of positioning characteristics against the second set of positioning characteristics to determine a degree of displacement specified for the first screen element, wherein the degree of displacement represents an approximate number of pixels that would exist between a first point and a second point, wherein the first point is a point on a display screen that would be at a given point within the screen element when the screen element is displayed on the display screen based on the first set of positioning characteristics, and wherein the second point is a point on the display screen that would be at the given point within the screen element when the screen element is displayed on the display screen based on the second set of positioning characteristics;
   determine whether the degree of displacement exceeds a predetermined threshold value that represents a number of pixels; and
   if the degree of displacement exceeds the predetermined threshold value, display the first screen element on the display screen based on modified positioning characteristics determined by shifting coordinates specified in the first set of positioning characteristics toward coordinates specified in the second set of positioning characteristics.

16. A computer storage medium as defined in claim 15, wherein after causing the one or more processors to analyze the first set of positioning characteristics against the second set of positioning characteristics, the instructions, when executed by the one or more processors, further cause the one or more processors to display the first screen element on the display screen based on the first set of positioning characteristics if the degree of displacement does not exceed the predetermined threshold value.

17. A computer storage medium as defined in claim 16, wherein the second screen element comprises a plurality of glyphs.

18. A computer storage medium as defined in claim 17, wherein the second screen element represents a base exponential expression for a formula and the first screen element represents a superscript to the second screen element.

* * * * *